(12) United States Patent
Lin et al.

(10) Patent No.: US 7,058,413 B2
(45) Date of Patent: Jun. 6, 2006

(54) MULTICAST MANAGEMENT MECHANISM FOR MOBILE NETWORKS

(75) Inventors: Yi-Bing Lin, Taichung (TW); Ai-Chun Pang, Hsin-Chu (TW); Chun-Shiow Chen, Hsin-Chu (TW); Vincent Feng, Hsin-Chu (TW)

(73) Assignee: Industrial Technology Research Institute (TW)

( * ) Notice: Subject to any disclaimer, the term of this patent is extended or adjusted under 35 U.S.C. 154(b) by 490 days.

(21) Appl. No.: 10/215,299

(22) Filed: Aug. 8, 2002

(65) Prior Publication Data

US 2004/0203756 A1  Oct. 14, 2004

(30) Foreign Application Priority Data

Mar. 15, 2002 (TW) .............................. 91104953 A

(51) Int. Cl.
*H04Q 7/20* (2006.01)

(52) U.S. Cl. .............................. 455/456.3; 455/456.1; 455/433; 455/414.2

(58) Field of Classification Search ................ 455/433, 455/414.3, 414.2, 456.1, 456.3
See application file for complete search history.

(56) References Cited

U.S. PATENT DOCUMENTS

| | | | |
|---|---|---|---|
| 6,188,911 B1 * | 2/2001 | Wallentin et al. | 455/524 |
| 6,370,390 B1 * | 4/2002 | Salin et al. | 455/466 |
| 6,434,396 B1 * | 8/2002 | Rune | 455/502 |
| 6,442,159 B1 * | 8/2002 | Josse et al. | 370/354 |
| 6,542,755 B1 * | 4/2003 | Tsukagoshi | 455/503 |
| 6,731,932 B1 * | 5/2004 | Rune et al. | 455/432.1 |
| 6,839,554 B1 * | 1/2005 | McDowell et al. | 455/412.2 |

FOREIGN PATENT DOCUMENTS

| | | |
|---|---|---|
| DE | 10064107 A1 | 6/2002 |
| EP | 1071296 A1 | 1/2001 |
| WO | WO98/25422 | 6/1998 |

* cited by examiner

*Primary Examiner*—Jean Gelin
*Assistant Examiner*—Un C. Cho
(74) *Attorney, Agent, or Firm*—Fish & Richardson P.C.

(57) ABSTRACT

A multicast management mechanism for mobile networks. The mechanism proposes a multicast table approach to considerably reduce the number of short messages and multimedia messages sent to a service area, thereby reducing its paging cost. The multicast management mechanism for mobile networks includes the steps: establishing a VLR recorder table in a home location register (HLR), to record VLR addresses located by multicast users and the total number of multicast users in each VLR; and establishing LA tables, to record LA addresses in each VLR and the total number of multicast users in each LA.

22 Claims, 6 Drawing Sheets

US 7,058,413 B2

MULTICAST MANAGEMENT MECHANISM FOR MOBILE NETWORKS

Pursuant to 35 U.S.C. § 119(a)–(d), this application claims priority from Taiwanese application no. 91104953, filed on Mar. 15, 2002.

BACKGROUND OF THE INVENTION

1. Field of the Invention

The invention relates to mobile network management, especially to a multicast management mechanism for mobile networks, which proposes a multicast table approach to support multicast that minimizes the paging cost.

2. Description of Related Art

In 3GPP 43.068 specification, Global System for Mobile Communications or Universal Mobile Telecommunications System (GSM/UMTS) provide voice group call service through a broadcast mechanism. Specifically, all service areas are paged when a voice call is delivered. In FIG. 1, a GSM/UMTS service area is partitioned into several location areas (LAs), such as LA1–LA3, LA4–LA6, or LA7–LA8, and communicates with a mobile switching center (MSC) such as 40, 60 or 80, having a respective visitor location register (VLR) such as 50, 70 or 90. The remaining numbers in FIG. 1 will be described later. As shown in FIG. 1, a typical GSM/UMTS (shown in chapter 8 of 3GPP TS 09.02 specification) will page all service areas (step 5) even if location areas LA2, LA4, LA5, LA7, and LA8 do not contain any multicast users such as 100–103. Additionally, as shown in FIG. 2, multicast is achieved in iSMS (shown in "iSMS: An Integration Platform for Short Message Service and IP Networks", IEEE Network, March/April 2001, by Herman Chung-Hwa Rao, Di-Fa Chang, and Yi-Bing Lin) by sending every message to individual user on a multicast list. This can avoid messages being sent to a location area without a multicast user, as that shown in FIG. 1. However, if n users are in a service area, the same message is sent n times to this service area. For example, the same message is sent twice to the location area LA1 for users 100 and 101. The remaining numbers will be described later. The above two approaches are clearly not effective. Neither existing 2G systems with voice function or existing 3G systems with multimedia function can support efficient multicasting.

SUMMARY OF THE INVENTION

Accordingly, an object of the invention is to provide a multicast management mechanism for mobile networks, which provides efficient multicast service in GSM/UMTS without modifying the standard location update messages.

Another object of the invention is to provide a multicast management mechanism for mobile networks, which proposes a multicast table approach to reduce a certain number of short messages and multimedia messages sent to a service area.

The invention provides a multicast management mechanism for mobile networks, including establishing a VLR recorder table in a home location register (HLR), to record VLR addresses located by multicast users and the total number of multicast users in each VLR; and establishing LA tables in VLRs, to record LA addresses in each VLR and the total number of multicast users in each LA.

DETAILED DESCRIPTION OF THE INVENTION

The following numbers denote the same elements throughout the description and drawings.

The multicast management mechanism according to the invention can be used to deliver short messages or multimedia messages. In UMTS, short messages are delivered through the control plane of the circuit switched domain while multimedia messages are delivered through the user plane of the packet switched domain. According to the GSM requirement, the application of the invention is generally the same as the following explanation example of short message delivery through the circuit switched domain according to the UMTS requirement.

A UMTS network tracks the locations of mobile stations (MSs) so that incoming calls can be delivered to the subscribers. To exercise location tracking, a UMTS service area is partitioned into several LAs. Every LA consists of a group of base stations (not shown) that communicate with the MSs (such as 100–103 in FIGS. 1–2) over radio link. The major task of mobility management is to update the location of an MS when it moves from an LA to another. The location information is stored in the UMTS mobility database such HLR (such as 30 in FIGS. 1–2) and VLR(s) (such as 50, 70 and 90 in FIGS. 1–2). Every VLR maintains the information of a group of LAs.

Figure 3:
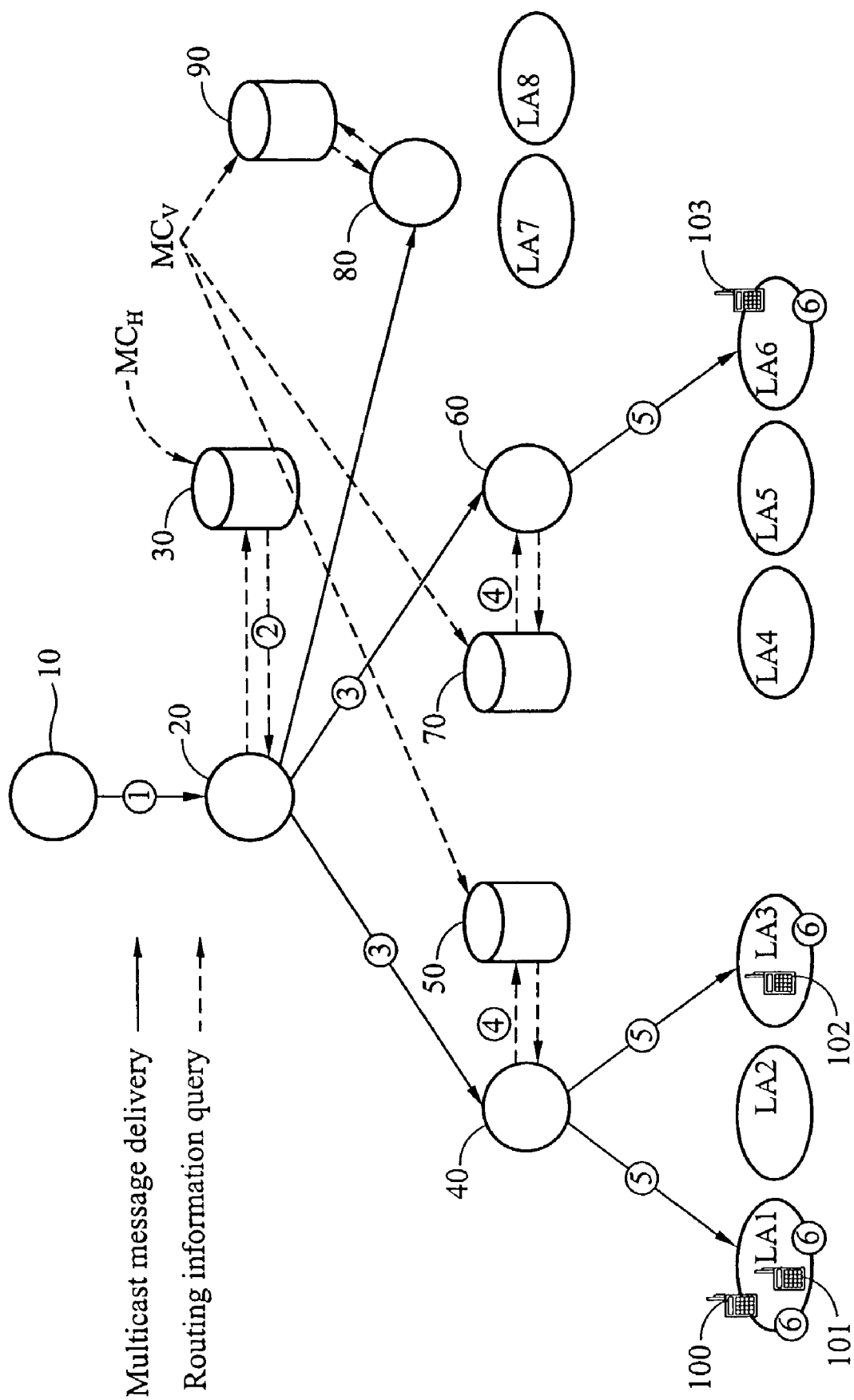
FIG. 3 is a schematic diagram of a multicast method for the GSM/UMTS configuration of FIG. 1 according to the invention.

FIG. 3 is a schematic diagram of a multicast method according to the invention. In FIG. 3, the multicast method utilizes the existing GSM/UMTS short message architecture in FIG. 1. This architecture includes a short message-service center (SM-SC) 10 implemented on a host (not shown), a short message service gateway mobile switching center (SMS GMSC) 20 implemented on the host or the other computer (not shown), a home location register (HLR) 30 implemented on the host or another computer (not shown), multiple mobile switching centers (MSCs) 40, 60 and 80 implemented on the host or another computer (not shown), multiple visitor location registers (VLRs) 50, 70 and 90 implemented on the host or another computer (not shown), and multiple location areas (LAs) LA1–LA8.

As shown in FIG. 3, the VLR 50 covers LAs LA1–LA3. The VLR 70 covers LAs LA4–LA6. The VLR 90 covers LAs LA7–LA8. Before multicast messages are issued by the SM-SC 10, the multicast management mechanism of the invention establishes multicast tables in the HLR and every VLR. The multicast table is implemented by establishing a VLR record table (referred to as a notation $MC_H$) in a home location register (HLR), to record VLR addresses located by multicast users and the total number of multicast users in each VLR address; and establishing an LA record table (referred to as a notation $MC_V$) in each VLR, to record LA addresses in each VLR and the total number of multicast users in each LA address. Thus, as shown the example in FIG. 3, there are two MSs in LA1, one MS in LA3, and one MS in LA6. The $MC_H$ table in the HLR 30 records:

$$MC_H[VLR1]=3, MC_H[VLR2]=1, \text{ and } MC_H[VLR3]=0. \quad (1)$$

The $MC_V$ table in the VLR 50 records:

$$MC_V[LA1]=2, MC_V[LA2]=0, \text{ and } MC_V[LA3]=1. \quad (2)$$

The $MC_V$ table in the VLR 70 records:

$$MC_V[LA4]=0, MC_V[LA5]=0, \text{ and } MC_V[LA6]=1. \quad (3)$$

The $MC_V$ table in the VLR 90 records:

$$MC_V[LA7]=0 \text{ and } MC_V[LA8]=0 \quad (4)$$

Accordingly, when multicast messages are issued by the SM-SC 10, a multicast group is associated with the SMS GMSC 20 according to standard UMTS/GSM procedures. The SM-SC 10 always forwards messages to the SMS GMSC 20 of the multicast group (step 1). The SMS GMSC 20 first refers the $MC_H$ table to obtain location information of the multicast users stored in the HLR 30 (step 2). The SMS GMSC 20 then forwards the information to the respective MSCs 40, 60 and 80 of the multicast users 100–103 (step 3). These MSCs 40, 60 and 80 refer to their corresponding $MC_V$ tables to obtain location information of the multicast users stored in the VLRs 50, 70 and 90 (step 4) and to page the LAs of the multicast users. The logical path for message multicast is □⇆□⇆□⇆□.

However, a multicast user does not stay at a fixed location. When the multicast user moves from one LA to another, a registration for the multicast user is performed to obtain the latest tables of $MC_H$ and $MC_V$. The registration is described in FIG. 4.

Figure 4:
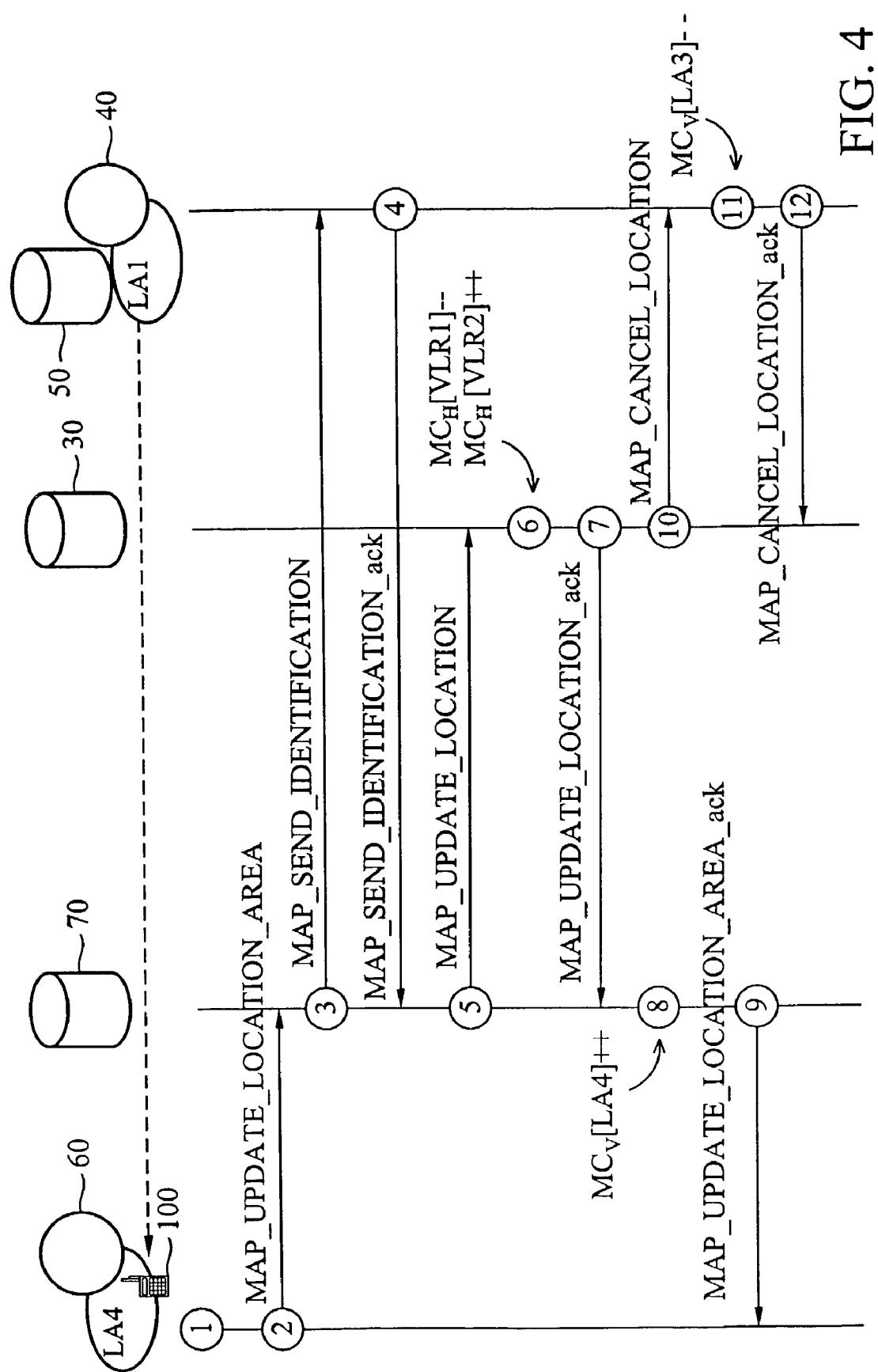
FIG. 4 is a flowchart of a registration performed on a multicast user from a service area to another service area according to the invention.

Two types of movement are considered: inter-location area (intra-VLR) movement and inter-VLR movement. FIG. 4 is a flowchart of the registration to be performed when a multicast user is making inter-VLR movement. We can see how the tables $MC_H$ and $MC_V$ are maintained through this registration. FIG. 4 assumes that exactly one MSC is connected to a VLR. This one-MSC-per-VLR configuration is typical implementation in existing GSM/UMTS systems. In inter-VLR movement, the old and new LAs are connected to different MSCs and thus different VLRs. If the MS 100 (FIG. 3) moves from LA1 to LA4, details are as follows.

Step 1: the MS 100 receives a location signal other than that of its original MSC 40.

Step 2: according to the location signal, the MS 100 sends a location update request message to its new MSC 60. The MSC 60 receives the location update request message and sends a location area update message (MAP_UPDATE_LOCATION_AREA) to a VLR 70 connected to the MSC 60.

Step 3: since the MS 100 is a new visitor to the VLR 70, the VLR 70 does not have a VLR record of the MS 100. According to the location area update message (MAP_UPDATE_LOCATION_AREA) received from the MSC 60 at Step 2, the VLR 70 identifies the address of the previous VLR (i.e., device 50 in FIG. 4) and sends a user identification message (MAP_SEND_IDENTIFICATION) to the VLR 50. The message provides information for the VLR 50 to retrieve the International Mobile Subscriber Identity (IMSI) of the MS 100 in the database. IMSI is the unique subscriber identity which identifies the MS 100 in its corresponding HLR 30.

Step 4: the VLR 50 sends back a user identification acknowledgement message (MAP_SEND_IDENTIFICATION_ack) and sends back the IMSI to VLR 70. The VLR 70 creates a VLR record storing information of the MS 100 in its database, updates the LA identity and the MSC fields of the VLR record.

Step 5: the VLR 70 derives the HLR 30 address of the MS 100 from the MS's IMSI receipt of the VLR 50 and sends a location update operation message (MAP_UPDATE_LOCATION) to the HLR 30. Using the received IMSI, the HLR identifies the MS's record and updates MSC and VLR addresses in the record for the MS 100.

Step 6: the HLR 30 decreases the table $MC_H$ [VLR1] by 1 and increases the table $MC_H$[VLR2] by 1.

Step 7: the HLR 30 sends back a location update operation acknowledgment message (MAP_UPDATE_LOCATION_ack) to apprise the VLR 70 of the completed update action.

Step 8: the VLR 70 receives the location update operation acknowledgment message (MAP_UPDATE_LOCATION_ack) and increases the table $MC_V$[LA4] by 1.

Step 9: the VLR 70 sends back a location area update acknowledgement message ($MAP_{13}$ $UPDATE_{13}$ $LOCATION_{13}$ $AREA_{13}$ ack) to apprise the MS 100 of the completed update action.

Step 10: the HLR 30 sends a location cancellation message ($MAP_{13}$ $CANCEL_{13}$ LOCATION) to the VLR 50 to delete its obsolete record for the MS 100.

Step 11: the VLR 50 receives the location cancellation message and decreases the table $MC_V$[LA1] by 1.

Step 12: the VLR 50 acknowledges a location cancellation acknowledgement message ($MAP_{13}$ $CANCEL_{13}$ LOCATION) and completes the registration.

In this procedure, Steps 1–5, 7, 9, 10 and 12 are defined in the standard UMTS/GSM specifications. Steps 6, 8, and 11 are executed if the MS is a multicast user. Before the registration, the values stored in the multicast tables are given in equations (1), (2), (3), and (4). After the registration, the table $MC_V$ for the VLR 90 in FIG. 3 remains the same. The table $MC_H$ becomes $MC_H$[VLR1]=2, $MC_H$ [VLR2]=2, and $MC_H$[VLR3]=0. The table $MC_V$ for the VLR 50 becomes $MC_V$[LA1]=1, $MC_V$[LA2]=0, and $MC_V$[LA3] =1. The table $MC_V$ for the VLR 70 becomes $MC_V$[LA4]=1, $MC_V$[LA5]=0, and $MC_V$[LA6]=1.

For inter-LA (intra-VLR) movement, only Steps 1, 2, 8, and 9 in FIG. 4 are executed. If the MS 100 in FIG. 3 moves from LA1 to LA2, the inter-LA registration is performed as follows.

Step 1: the MS 100 receives a location signal other than that of its original base station (BS) (in this case, location area changes from LA1 to LA2).

Step 2: according to the location signal, the MS 100 sends a location update request message to its MSC 40. The MSC 40 receives the location update request message and sends a location area update message ($MAP_{13}$ $UPDATE_{13}$ $LOCATION_{13}$ AREA) to a VLR 50 connected to the MSC 40.

Step 3: after the receipt of location area update message ($MAP_{13}$ $UPDATE_{13}$ $LOCATION_{13}$ AREA), the VLR 50 discovers the MS 100 is in the same service area by the VLR 50 and thus increases the table $MC_V$[LA2] by 1 and decreases the table $MC_V$[LA1] by 1.

Step 4: the VLR 50 sends back a location area update acknowledgement message ($MAP_{13}$ $UPDATE_{13}$ $LOCATION_{13}$ $AREA_{13}$ ack) to apprise the MS 100 of the completed update action.

Before the inter-LA (intra-VLR) registration, the contents of the multicast tables are given in (1), (2), (3), and (4). After the registration, the tables $MC_H$ for the HLR 30, $MC_V$ for the VLR 70 and $MC_V$ for the VLR 90 remain the same, and the table $MC_V$ for the VLR 50 becomes $MC_V[LA1]=1$, $MC_V[LA2]=1$, and $MC_V[LA3]=1$. From the descriptions of the above procedure, it is apparent that the tables $MC_H$ and $MC_V$ can accurately record the multicast users distributed in the LAs of a UMTS network.

This section describes how short message or multimedia messages are multicast using the multicast tables. In an example of short message, the procedure is described in the following steps (with reference to FIG. 3):

Step 1. The SM-SC 10 sends a multicast message to the SMS GMSC 20.

Step 2. Through a short message routing request ($MAP_{13}$ $SEND_{13}$ $ROUTING_{13}$ $INFO_{13}$ $FOR_{13}$ SM), the SMS GMSC 20 requests the routing information from the HLR 30. The HLR 30 searches the multicast table $MC_H$. If $MC_H[VLR_i]$ >0 (that is, more than one multicast user is in the control region of $VLR_i$), then the mobile station roaming number (MSRN) for the MSC of VLR i is returned from the HLR 30 to the SMS GMSC 20 through a short message routing request acknowledgement ($MAP_{13}$ $SEND_{13}$ $ROUTING_{13}$ $INFO_{13}$ $FOR_{13}$ $SM_{13}$ ack). MSRN is used to identify the destination MSCi of the message.

Step 3. The SMS GMSC 20 delivers the multicast message to the destination MSCi (based on the MSRNs received from the HLR 30) by sending a short message forward message ($MAP_{13}$ $FORWARD_{13}$ $SHORT_{13}$ MESSAGE). For example, in FIG. 3, the multicast message is sent to MSC1 and MSC2.

Step 4. Every destination MSCi sends a short message forward location area request ($MAP_{13}$ $SEND_{13}$ $INFO_{13}$ $FOR_{13}$ $MT_{13}$ SMS) to its corresponding VLR to obtain the subscriber related information. When the VLR receives this message, it searches the multicast table $MC_V$ to identify the LAs where the multicast members reside. These location areas LAj satisfy the condition $MC_V[LAj]>0$. As in FIG. 3, the LAs in VLR1 are LA1 and LA3. The LA in VLR2 is LA6. An indication check is executed by invoking a micro procedure called $Check_{13}$ Indication in the VLR to verify the data value of the message. If the tests are passed, the VLRs request the corresponding MSCs to page LA1□LA3 and LA6.

Step 5. The corresponding MSCs broadcast the message to the multicast users in the LAs following the standard GSM/UMTS paging procedures.

Step 6. The multicast users listen and receive the message broadcast in their respective LA. The multicast users start to receive the message.

From the above message delivery procedure, it is clear that only the LAs with multicast users will be paged for multicast. The LAs without multicast members will not be paged.

The following describes an analytic model to investigate three multicast approaches:

Approach $A_I$ is used in UMTS voice call service (where the voice calls are replaced by short messages). In this approach all LAs are paged when a multicast message arrives.

Approach $A_{II}$ is used in iSMS where multicast is achieved by sending a multicast message to every individual member in the multicast list.

Approach $A_{III}$ is the approach based on multicast tables. This approach pages the LAs where the multicast members reside. The LAs without multicast members are not paged.

The multicast costs of the above approaches are measured by the number of paging messages sent to the LAs at multicast message delivery.

Figure 1:
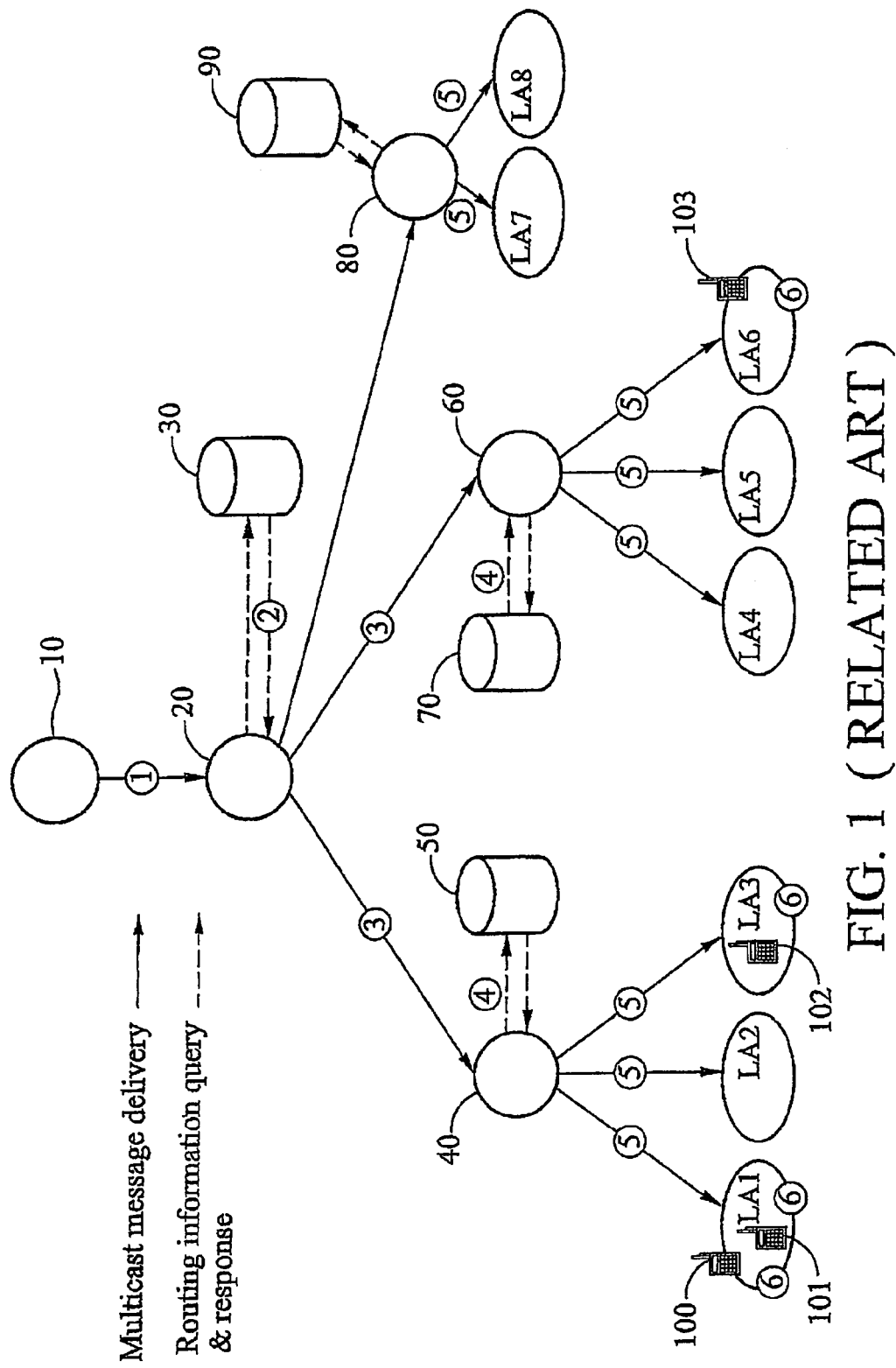
FIG. 1 is a schematic diagram of a typical multicast method for a GSM/UMTS configuration.
Figure 2:
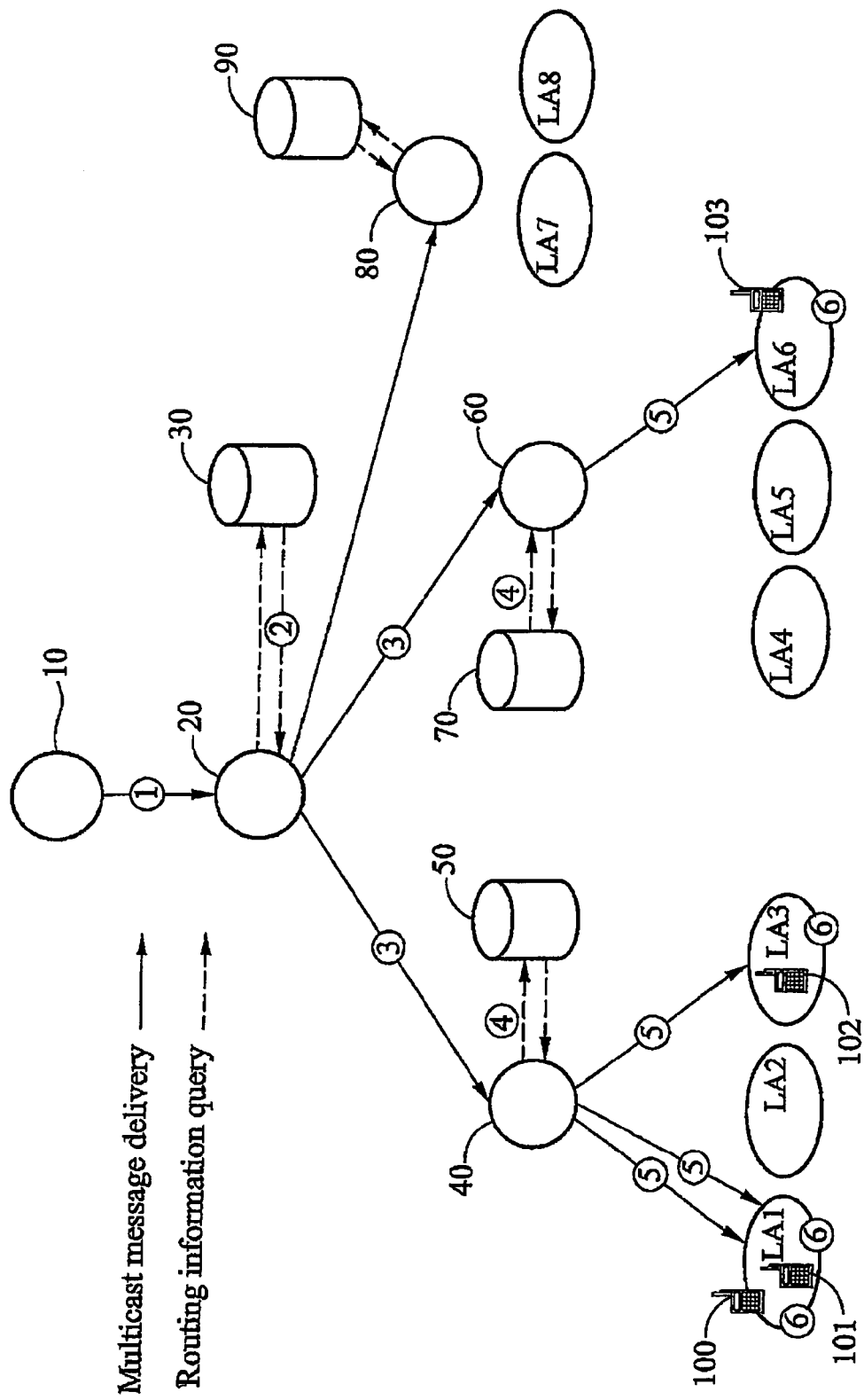
FIG. 2 is a schematic diagram of another typical multicast method for the GSM/UMTS configuration of FIG. 1.

An example is given in the particular multicast message delivery in FIGS. 1–3. The multicast cost for $A_I$ used in FIG. 1 is 8 because this approach needs paging to all location areas. The multicast cost for $A_{II}$ used in FIG. 2 is 4 because this approach must page all multicast users. The multicast cost for $A_{III}$ used in FIG. 3 is 3 because this approach must page all location areas where multicast users are.

Before analytic modeling and performance evaluation, consider two classes of LA. In class 1, LA has multicast user traffic $\rho_1=1/\delta$. In class 2, LA has multicast user traffic $\rho_2=\delta$. If $\delta>>1$, LA in class 1 has a small multicast user population and LA in class 2 has a large multicast user population.

If there are M location areas in the system, location areas are $\alpha M$ in class 1 and $(1-\alpha)M$ in class 2, where $\alpha$ is a weight. Additionally, in the following equations, the former is the compared performance of $A_{III}$ to $A_I$ while the latter is the compared performance of $A_{III}$ to $A_{II}$:

$$\theta_I = \frac{\text{Cost of } A_I}{\text{Cost of } A_{III}},$$

$$\theta_{II} = \frac{\text{Cost of } A_{II}}{\text{Cost of } A_{III}}$$

Figure 5B:
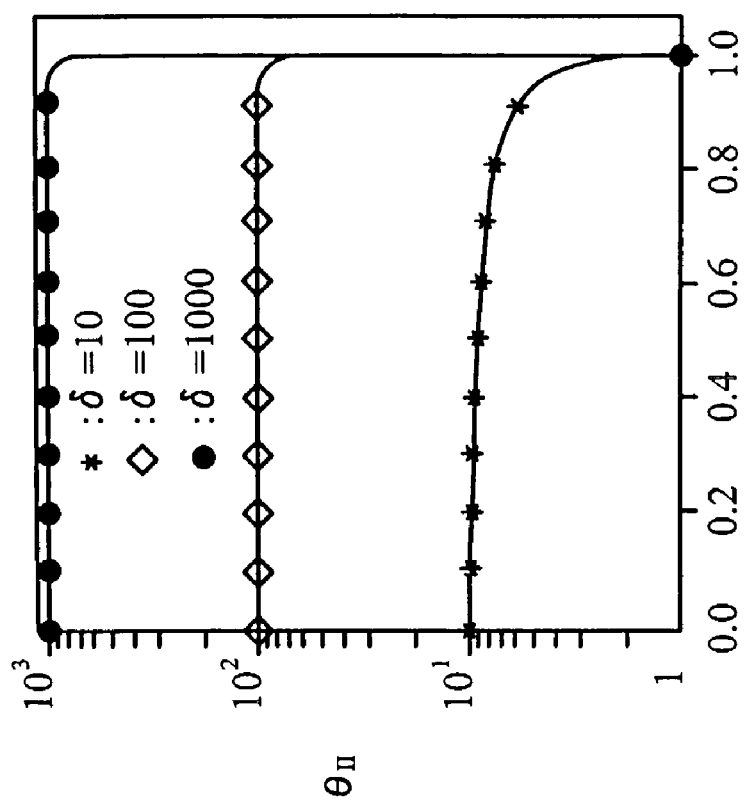
FIG. 5b is a comparison graph of the multicast methods in FIGS. 2 and 3.
Figure 5A:
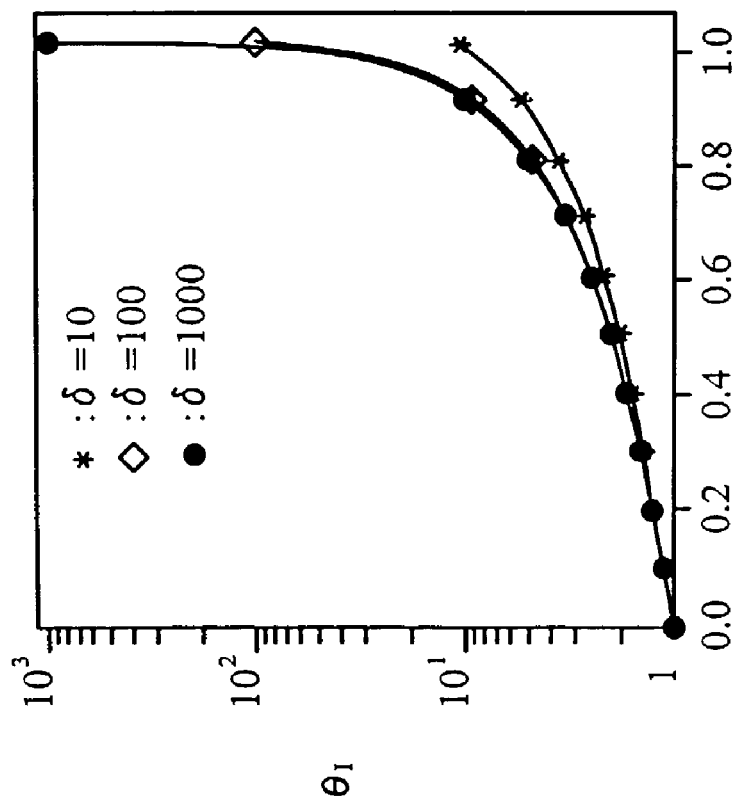
FIG. 5a is a comparison graph of the multicast methods in FIGS. 1 and 3.
Figure 6:
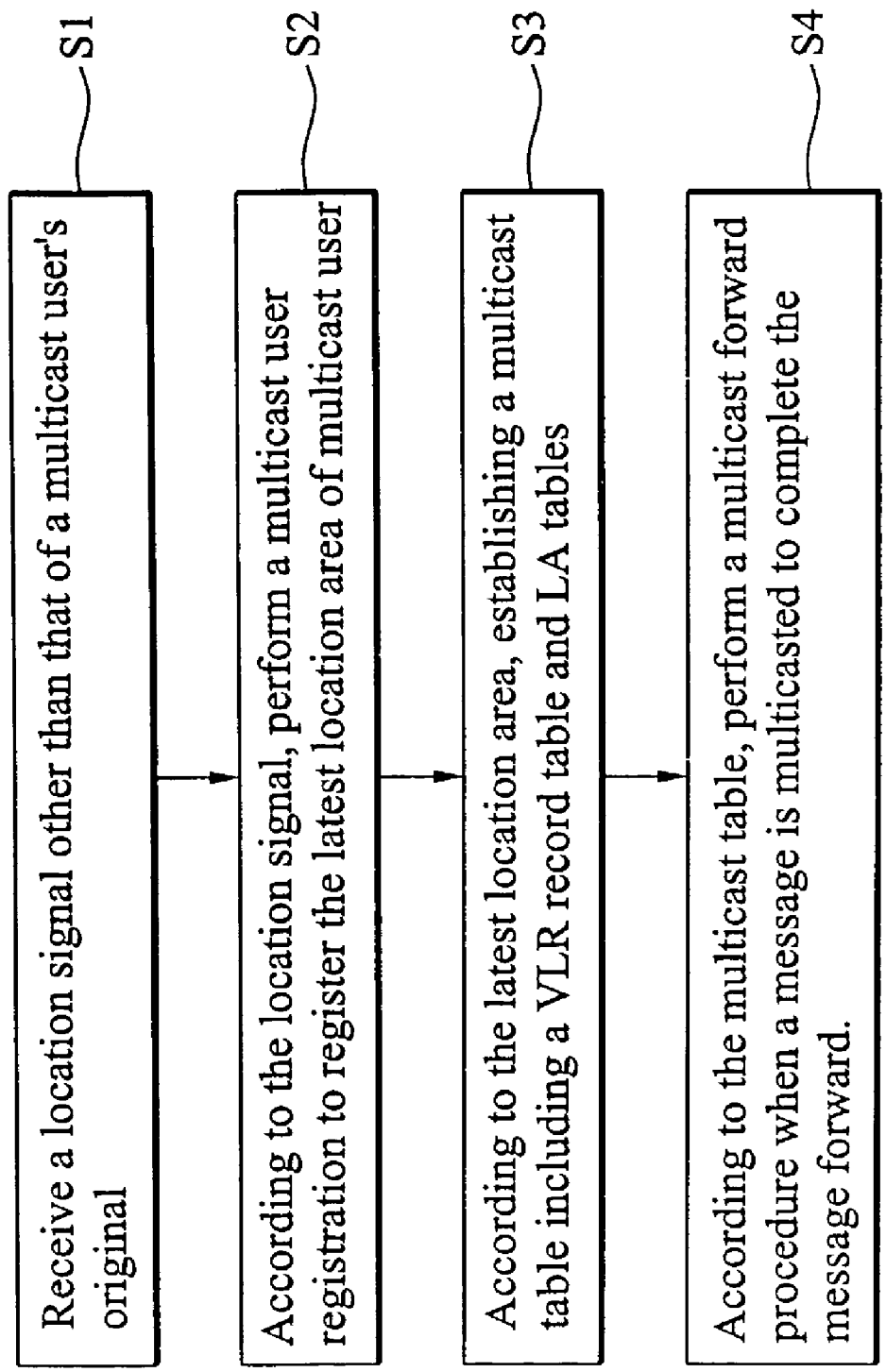
FIG. 6 is a flowchart of a multicast management mechanism according to the invention.

Further, FIGS. 5a and 5b respectively plot $\theta_I$ and $\theta_{II}$ against $\alpha$ at different $\delta$. As shown in FIGS. 5a and 5b, as $\alpha$ and $\delta$ increase, $\theta_I$ increases and $\theta_{II}$ decreases. When $\alpha=0$, $A_I$ and $A_{III}$ have similar performance (i.e., $\theta_I \cong 1$). When $\alpha=1$, $A_{II}$ and $A_{III}$ have similar performance (i.e., $\theta_{II} \cong 1$). $A_{III}$ significantly out performs $A_I$ when $\alpha>0.3$ (that is, when more than 30% of the LAs have few multicast users). Also, $A_{III}$ significantly out performs $A_{II}$ when $\alpha<0.9$ (that is, when less than 90% of the LAs have many multicast users). To conclude, $A_{III}$ always out performs $A_I$ and $A_{II}$, and the analytic model quantitatively shows the scenarios when the approach significantly out performs the previously proposed approaches.

Accordingly, the invention provides a multicast management mechanism for mobile networks. The multicast management mechanism for mobile networks includes the steps: receiving a location signal other than that of a multicast user's original (S1); according to the location signal, performing a multicast user registration to register the latest location area of the multicast user (S2); according to the latest location area, establishing a multicast table (S3) including a VLR record table in a home location register (HLR), to record VLR addresses located by all multicast users and the total number of multicast users in each VLR and a LA record table in a visitor location register (VLR), to record LA addresses in each VLR and the total number of multicast users in each LA; and according to the multicast table, performing a multicast forward procedure when a message is broadcast, to complete the message forward.

As a final remark, the implementation and execution of the multicast tables are very efficient. The cost for updating these tables can be ignored compared with the standard location update steps (location update message sending and VLR/HLR record modifications). Additionally, the mechanism can be implemented within the VLR and HLR without modifying the standard location update messages.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A multicast management mechanism for mobile networks, each mobile network having a mobile device, a short message-service center (SM-SC), a short message service gateway mobile switching center (SMS GMSC), an HLR, a first mobile switching center (MSC), a second mobile switching center, a first visitor location register (VLR) and a second visitor location register, when the mobile device moves from a first location area (LA) of the first MSC to a second LA of the second MSC, the multicast management mechanism comprising the steps:

the mobile device receiving a location signal from the second MSC;

according to the location signal, performing a multicast user registration to register the latest LA of the multicast user who owns the mobile device;

according to the latest location area, establishing a multicast table including a VLR record table in a home location register (HLR), and LA record tables, wherein:
the VLR record table records VLR addresses located by all multicast users and the total number of multicast users in each VLR; and
the LA record tables record LA addresses in each VLR and the total number of multicast users in each LA; and according to the multicast table, performing a multicast forward procedure when a message is on broadcast, to complete the multicast message forward; wherein the multicast forward procedure comprises the following steps:

the SM-SC sending a multicast message to the SMS GMSC;

the SMS GMSC sending a short message routing request (MAP SEND ROUTING INFO FOR SM) to the HLR to request for routing information of the mobile device;

upon receiving the short message routing request, the HLR searching the VLR record table for the routing information; and the MSCs of the multicast users who own the mobile device sending a short message forward location area request (MAP_SEND_INFO_FOR_MT_SMS) to its corresponding VLR to obtain the related information of the multicast users, and to search the LA record tables for identification of the LAs where the multicast users reside.

2. The multicast management mechanism for mobile networks of claim 1, wherein the mobile device is a cellphone.

3. The multicast management mechanism for mobile networks of claim 1, wherein the mobile device is a personal digital assistant (PDA).

4. The multicast management mechanism for mobile networks of claim 1, wherein the HLR is implemented in a host.

5. The multicast management mechanism for mobile networks of claim 1, wherein the HLR is implemented in a server.

6. The multicast management mechanism for mobile networks of claim 1, wherein the first and second VLRs are implemented in different servers.

7. The multicast management mechanism for mobile networks of claim 1, wherein, when the first and second VLRs are different, the multicast user registration comprises the steps:

step 1: the mobile device sending a location update request to the second MSC;

step 2: according to the location update request, the second MSC sending a location area update message (MAP_UPDATE_LOCATION_AREA) to the second VLR to change the LA of a multicast user who owns the mobile device from the first LA to the second LA;

step 3: according to the location area update message (MAP_UPDATE_LOCATION_AREA), the second VLR identifying the address of the first VLR;

step 4: according to the first VLR address identified, the second VLR sending a user identification message (MAP_SEND_IDENTIFICATION) to the first VLR to ask for a International Mobile Subscriber Identity (IMSI) of the mobile device to obtain the mobile device's identity;

step 5: storing the identity and according to the identity to determining the HLR address;

step 6: according to the HLR address determined, the second VLR sending a location update operation message (MAP_UPDATE_LOCATION) including the identity to the HLR;

step 7: according to the identity, the HLR recording addresses of the second MSC and the second VLR;

step 8: the HLR sending back a location update operation acknowledgment message (MAP_UPDATE_LOCATION_ack) to apprise the second VLR of the completed update action;

step 9: according to the location update operation acknowledgment message, the second VLR sending a location area update acknowledgement message (MAP_UPDATE_LOCATION_AREA_ack) to apprise the mobile device of the completed update action;

step 10: the HLR sending a location cancellation message (MAP—CANCEL_LOCATION) to the first VLR to delete its obsolete record for the mobile device; and step 11: according to the location cancellation message, the first VLR deleting the mobile device's location record and informing the HLR of the location cancellation to complete the registration.

8. The multicast management mechanism for mobile networks of claim 7, wherein step 8 further comprises the HLR respectively counting the number of the first and the second VLRs and recording the result counted into the VLR record table.

9. The multicast management mechanism for mobile networks of claim 7, wherein the step 9 further comprises the second VLR increasing a multicast user, who owns the mobile device, by 1 in the second LA and record the result into its respective LA table.

10. The multicast management mechanism for mobile networks of claim 7, wherein the step 11 further comprises the first VLR decreasing a multicast user, who owns the mobile device, by 1 in the first LA and recording the result into its respective LA table.

11. The multicast management mechanism for mobile networks of claim 7, wherein the MSCs are implemented in a computer to access the VLRs.

12. The multicast management mechanism for mobile networks of claim 5, wherein, when the first and second VLRs are the same, the multicast user registration comprises the steps:

step 1: the mobile device sending a location update request to the second MSC;

step 2: according to the location update request, the second MSC sending a location area update message (MAP_UPDATE_LOCATION_AREA) to the second VLR to change the LA of a multicast user who owns the mobile device from the first LA to the second LA;

step 3: according to the location area update message (MAP_UPDATE_LOCATION_AREA), the second VLR changing the multicast user's LA address and the total number of the multicast users in each LA; and step 4: the second VLR sending a location area update acknowledgement message (MAP_UPDATE_LOCATION_AREA_ack) to inform the mobile device of the completed registration.

13. The multicast management mechanism for mobile networks of claim 12, wherein in the step 3, the changing total number comprises decreasing the number of multicast users in first LA by 1, increasing the number of multicast users in second LA by 1, and recording the result into their corresponding LA record tables.

14. The multicast management mechanism for mobile networks of claim 1, wherein the multicast message forward further comprises:

if the VLR record table is not empty, the HLR sending a mobile station roaming number (MSRN) to the SMS GMSC through a short message routing request acknowledgement (MAP_SEND_ROUTING_INFO_FOR_SM_ack);

according to the MSRN, the SMS GMSC delivering the multicast message by sending short message forward messages (MAP_FORWARD_SHORT_MESSAGE) to respective MSCs of the multicast users who own the mobile device;

after the LA record tables recording the multicast users, performing a paging request to the LAs whose LA record tables are not empty;

according to the paging request, using a standard GSM/UMTS paging procedure to broadcast the multicast message to multicast users in the LAs whose LA record tables are not empty; and the multicast users including the multicast user who owns the mobile device starting to receive the multicast message after the standard GSM/UMTS paging procedure is performed.

15. The multicast management mechanism for mobile networks of claim 14, wherein in step 3, the MSRN provides the identification of the respective MSCs of the multicast users who own the mobile device.

16. The multicast management mechanism for mobile networks of claim 14, wherein the respective MSCs are implemented in a host.

17. The multicast management mechanism for mobile networks of claim 14, wherein the SMS GMSC is implemented in a host to access information stored in HLR.

18. The multicast management mechanism for mobile networks of claim 17, wherein the HLR is implemented in a host.

19. The multicast management mechanism for mobile networks of claim 17, wherein the HLR is implemented in a server.

20. The multicast management mechanism for mobile networks of claim 17, wherein the SMS GMSC is implemented in a server to access information stored in HLR.

21. The multicast management mechanism for mobile networks of claim 20, wherein the HLR is implemented in a server.

22. The multicast management mechanism for mobile networks of claim 14, wherein the standard GSM/UMTS paging procedure is in the document 3GPP TS 09.02.

* * * * *